US011639688B1

(12) United States Patent
Ertas et al.

(10) Patent No.: US 11,639,688 B1
(45) Date of Patent: May 2, 2023

(54) MOUNTING FOR PLANETARY GEAR SYSTEMS

(71) Applicants: General Electric Company, Schenectady, NY (US); GE Avio S.r.l., Rivalta di Torino (IT)

(72) Inventors: Bugra H. Ertas, Niskayuna, NY (US); Ravindra Shankar Ganiger, Bengaluru (IN); Andrea Piazza, Turin (IT)

(73) Assignees: GENERAL ELECTRIC COMPANY, Schenectady, NY (US); GE AVIO S.R.L., Rivalta di Torino (IT)

( * ) Notice: Subject to any disclaimer, the term of this patent is extended or adjusted under 35 U.S.C. 154(b) by 0 days.

(21) Appl. No.: 17/658,134

(22) Filed: Apr. 6, 2022

(51) Int. Cl.
*F02C 7/36* (2006.01)
*F16H 57/00* (2012.01)
*F16H 57/023* (2012.01)
*F01D 25/04* (2006.01)

(52) U.S. Cl.
CPC .............. *F02C 7/36* (2013.01); *F01D 25/04* (2013.01); *F16H 57/0006* (2013.01); *F16H 57/023* (2013.01); *F05D 2260/31* (2013.01); *F05D 2260/40311* (2013.01); *F05D 2260/602* (2013.01); *F05D 2260/96* (2013.01)

(58) Field of Classification Search
CPC ........ F02C 7/36; F01D 25/04; F16H 57/0006; F16H 57/023; F05D 2260/31; F05D 2260/40311; F05D 2260/602; F05D 2260/96
USPC ...................................................... 415/122.1
See application file for complete search history.

(56) References Cited

U.S. PATENT DOCUMENTS

| 8,529,197 | B1 | 9/2013 | Coffin et al. |
| 8,672,801 | B2 | 3/2014 | McCune et al. |
| 8,753,243 | B2 | 6/2014 | Mccune et al. |
| 8,961,113 | B2 | 2/2015 | Otto |
| 10,119,465 | B2 | 11/2018 | Sheridan |
| 10,816,078 | B2 | 10/2020 | Miller et al. |
| 10,830,334 | B2 | 11/2020 | McCune et al. |
| 2017/0219080 | A1* | 8/2017 | Niergarth .............. F16C 27/045 |
| 2019/0120363 | A1 | 4/2019 | Grubba |

FOREIGN PATENT DOCUMENTS

WO WO-2021005306 A1 * 1/2021 .............. F02C 3/107

* cited by examiner

*Primary Examiner* — Yi-Kai Wang
(74) *Attorney, Agent, or Firm* — Venable LLP; Edward A. Kmett; Michele V. Frank

(57) ABSTRACT

A planetary gear system includes a sun gear, a plurality of planet gears connected to a carrier and engaging with the sun gear, and a ring gear assembly including a damper housing, and a ring gear connected to the damper housing and engaging with the plurality of planet gears. The ring gear includes a geared wall having a plurality of gear teeth engaging with the plurality of planet gears, and a damper housing attachment member radially spaced outward of the geared wall and attaching the ring gear to the damper housing. A first end of the geared wall and the damper housing engage each other via a plurality of squeeze film damping members, and a second end of the geared wall is connected to the damper housing attachment member via a flexible damping wall that is configured to provide a radial damping of the second end of the geared wall.

20 Claims, 13 Drawing Sheets

MOUNTING FOR PLANETARY GEAR SYSTEMS

TECHNICAL FIELD

The present disclosure relates to mounting for a planetary gear system in a gas turbine engine.

BACKGROUND

Gas turbine engines are known to include a planetary gear system that provides a speed reduction from an input shaft connected to a low-pressure turbine and an output shaft connected to a fan assembly. Planetary gear systems implemented in gas turbine engines typically include a sun gear connected to the input shaft, a plurality of planet gears connected to a carrier, and a ring gear. The sun gear is typically connected to the input shaft from the low-pressure turbine. In a star gear arrangement, the carrier having the planet gears mounted thereto is stationary, while the ring gear is arranged to rotate and is connected to the output shaft. In contrast, in a planetary gear system, the carrier is connected to the output shaft and rotates, while the ring gear is mounted stationary within the system. In the latter system, the rotation of the carrier and the connected planet gears induces various loads to the ring gear, including radial loads, longitudinal loads, and torsional loads. Each of the loads injects a deflection to the ring gear and causes vibrations within the planetary gear system that are then transferred to the frame structure to which the ring gear is connected.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, and/or structurally similar elements.

DETAILED DESCRIPTION

Figure 1:
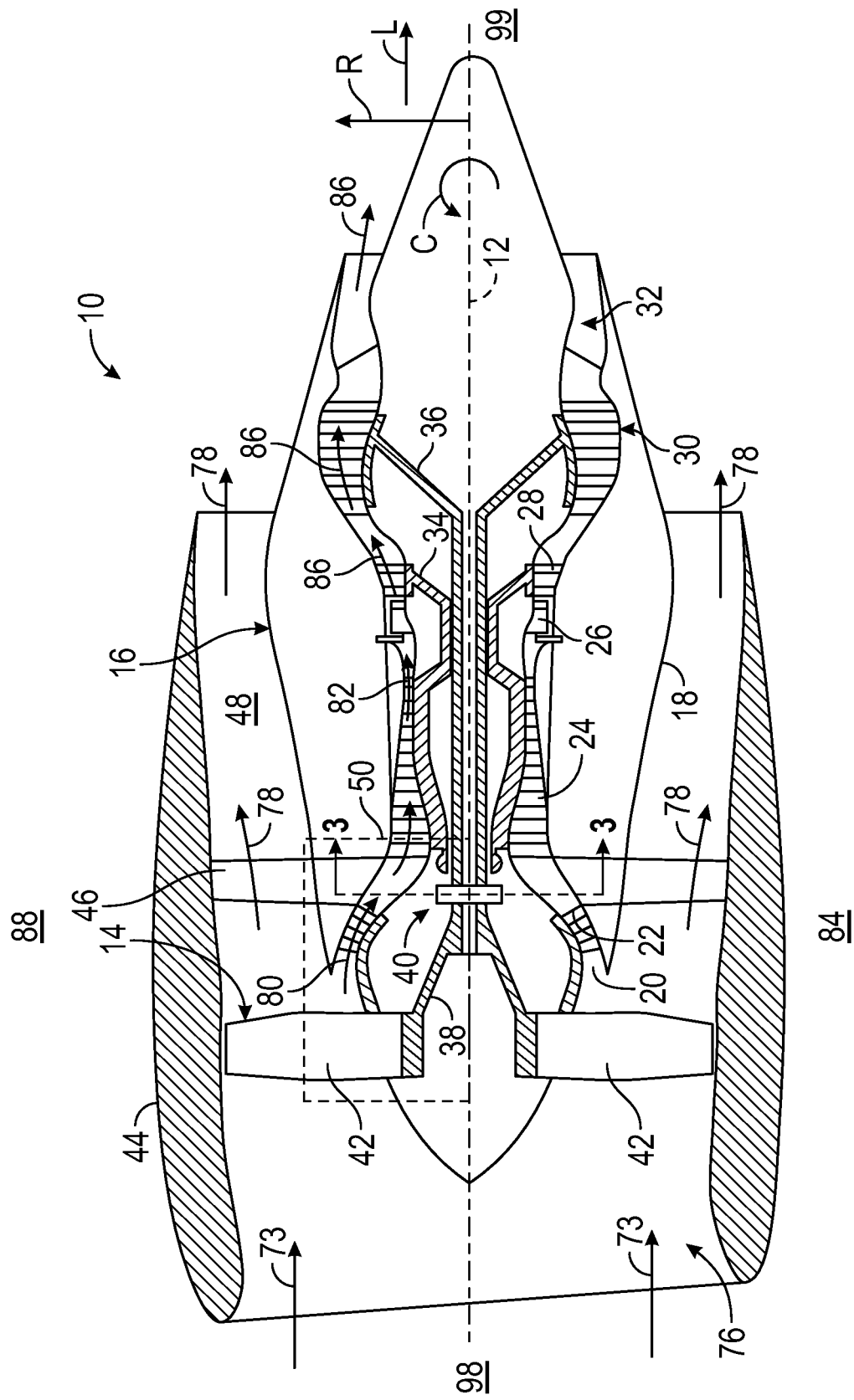
FIG. 1 is a schematic partial cross-sectional side view of an exemplary high by-pass turbofan jet engine, according to an aspect of the present disclosure.

Features, advantages, and embodiments of the present disclosure are set forth, or apparent from, a consideration of the following detailed description, drawings, and claims. Moreover, it is to be understood that the following detailed description is exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the spirit and the scope of the present disclosure.

As used herein, the terms "first" and "second" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows. The terms "top" or "bottom" refer to the relative side or direction with respect to a gas turbine engine being mounted on an aircraft that is level with the ground.

Some gas turbine engines are known to include a planetary gear system that provides a speed reduction from an input shaft connected to a low pressure turbine and an output shaft connected to a fan assembly. Planetary gear systems implemented in gas turbine engines typically can include a sun gear connected to the input shaft, a plurality of planet gears connected to a carrier, and a ring gear. The sun gear is typically connected to the input shaft from the low pressure turbine, and the carrier is connected to the output shaft that is connected to a fan assembly. Thus, the carrier and the planet gears rotate, while the ring gear is mounted stationary within the system. The rotation of the carrier and the planet gears induces various loads to the ring gear, including radial loads, longitudinal loads, and torsional loads. Each of the loads can inject a deflection to the ring gear and cause vibrations within the planetary gear system that are then transferred to the frame structure to which the ring gear is connected.

The present disclosure addresses the foregoing by providing a planetary gear system having a flexible damped mounting so as to dampen each of the loads induced to the ring gear mounted to the frame structure. In particular, the ring gear is connected to a damper housing that is mounted to the frame structure. The ring gear includes a geared wall that engages with the planet gears. On one end, the geared wall engages with the damper housing via a plurality of squeeze film damping members. A squeeze film fluid, such as oil, is provided to the squeeze film damping members to provide a squeeze film damping of the ring gear in a radial direction, in a longitudinal direction, and in a torsional (circumferential) direction. On the other end of the geared wall, a flexible damping wall is included to provide a radial stiffness to the geared wall. In one aspect, the flexible damping wall may be in the form of a semi-circular tubular-shaped wall extending in the circumferential direction that provides a desired flexible radial stiffness to the geared wall, thereby dampening radial vibrations. Thus, by including the flexible damping wall and the squeeze film damping members, vibrations that may occur in the radial direction, the longitudinal direction, and the torsional direction can be dampened to reduce the potential of the vibrations being transferred to the frame structure.

Referring now to the drawings, FIG. 1 is a schematic partial cross-sectional side view of an exemplary high by-pass turbofan jet engine 10, herein referred to as "engine 10," as may incorporate various embodiments of the present disclosure. Although further described below with reference to a ducted turbofan engine, the present disclosure is also applicable to planetary gear systems in general, or to turbomachinery in general, including turbojet, turboprop, and turboshaft gas turbine engines, including marine and industrial turbine engines and auxiliary power units. In addition, the present disclosure is not limited to ducted fan type turbine engines, such as that shown in FIG. 1, but can be implemented in unducted fan (UDF) type turbine engines. As shown in FIG. 1, engine 10 has an axial centerline axis 12 that extends therethrough from an upstream end 98 to a downstream end 99 for reference purposes. The axial centerline axis 12 may define a longitudinal direction (L) of the engine 10, while a radial direction (R) extends outward from the axial centerline axis 12, and a circumferential direction extends about the axial centerline axis 12. As the engine 10 may be installed on a vehicle, such as an aircraft, in relation to the vehicle being at a ground operating condition, a bottom side 84 may correspond to a ground-side of the engine 10 nearest to the ground, and a radially top side 88 may correspond to a skyward-side of the engine 10 opposite the bottom side 84.

In general, engine 10 may include a fan assembly 14 and a core engine 16 disposed downstream from the fan assembly 14. The core engine 16 may generally include an outer casing 18 that defines an annular inlet 20. The outer casing 18 encases, or at least partially forms, in serial flow relationship, a compressor section (22/24) having a low pressure (LP) compressor 22, a high pressure (HP) compressor 24, a combustor 26, a turbine section (28/30) including a high pressure (HP) turbine 28 and a low pressure (LP) turbine 30, and a jet exhaust nozzle section 32. A high pressure (HP) rotor shaft 34 drivingly connects the HP turbine 28 to the HP compressor 24. A low pressure (LP) rotor shaft 36 drivingly connects the LP turbine 30 to the LP compressor 22. The LP rotor shaft 36 may also be connected to a fan shaft 38 of the fan assembly 14 by way of a planetary gear system 40, which will be described in more detail below.

As shown in FIG. 1, the fan assembly 14 includes a plurality of fan blades 42 that are coupled to, and extend radially outwardly from, the fan shaft 38. An annular fan casing or a nacelle 44 circumferentially surrounds the fan assembly 14 and/or at least a portion of the core engine 16. In one embodiment, the nacelle 44 may be supported relative to the core engine 16 by a plurality of circumferentially spaced outlet guide vanes or struts 46. Moreover, at least a portion of the nacelle 44 may extend over an outer portion of the core engine 16 so as to define a bypass airflow passage 48 therebetween.

In operation, air 73 enters the nacelle 44 at a nacelle inlet 76, and a portion of the air 73 enters the compressor section (22/24) as a compressor inlet air flow 80, where the compressor inlet air flow 80 is compressed to form compressed air 82. Another portion of the air 73 enters the bypass airflow passage 48, thereby providing a bypass airflow 78. The compressed air 82 from the compressor section (22/24) enters the combustor 26, where the compressed air 82 is then mixed with fuel and ignited and burned within the combustor 26 to generate combustion gases 86. The combustion gases 86 then flow further downstream into the HP turbine 28 and the LP turbine 30, thereby causing the HP rotor shaft 34 and the LP rotor shaft 36 to rotate. The rotation of the LP rotor shaft 36 also causes the fan shaft 38 to rotate via the planetary gear system 40. The combustion gases 86 then exit through the jet exhaust nozzle section 32.

Figure 2:
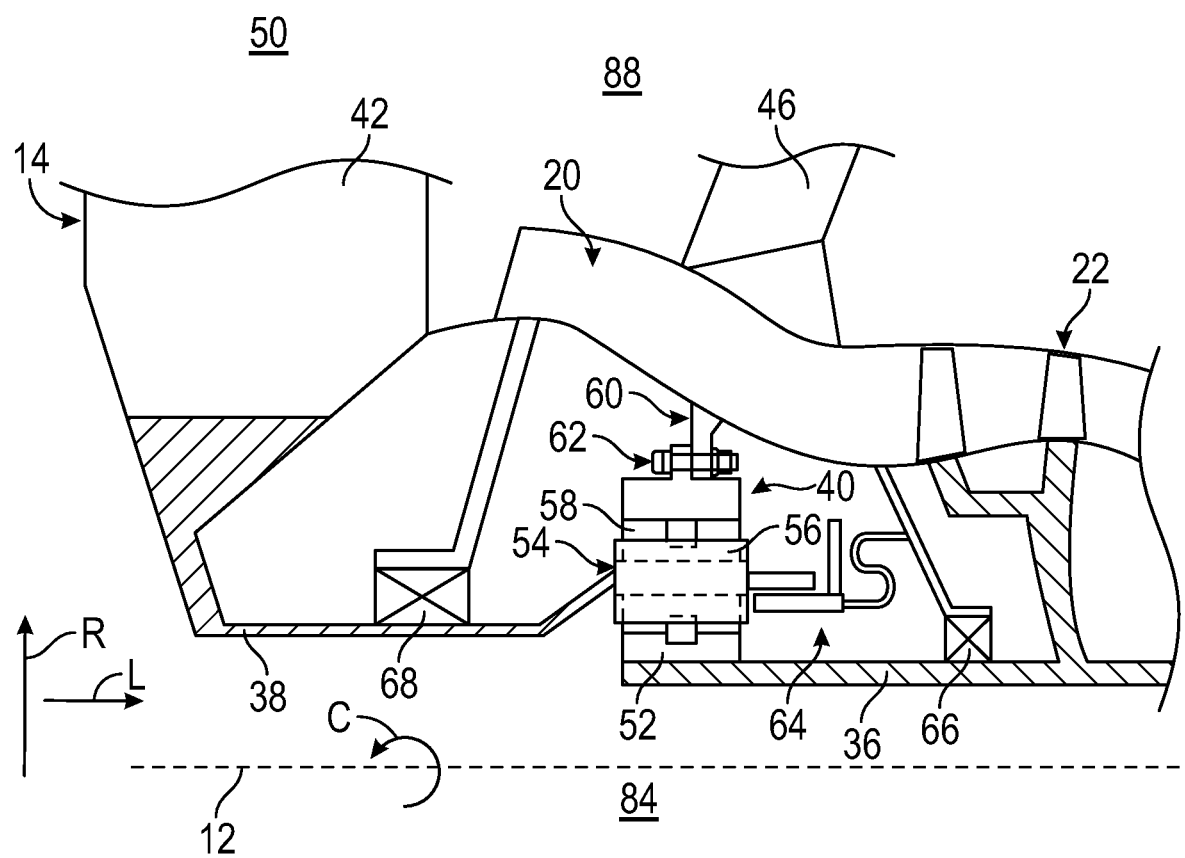
FIG. 2 is an enlarged schematic partial cross-sectional side view of a portion of the high by-pass turbojet engine taken at detail view 50 of FIG. 1, according to an aspect of the present disclosure.

FIG. 2 is an enlarged schematic partial cross-sectional side view of a portion of the high by-pass turbojet engine taken at detail view 50 of FIG. 1, according to an aspect of the present disclosure. As shown in FIG. 2, and as will be described in more detail below, the planetary gear system 40 includes a sun gear 52 that is connected to the LP rotor shaft 36, a carrier 54 that may include a plurality of planet gears 56 that engage with the sun gear 52, and a ring gear 58 that engages with the planet gears 56. The carrier 54 is connected to the fan shaft 38 so as to drive the fan assembly 14. The planetary gear system 40 is connected to a frame structure 60 via, for example, a plurality of fasteners 62. The planetary gear system 40 is also connected to a lubrication system 64, which may include a pump and a collection sump (not shown) that provides a lubricant, such as oil, to the planetary gear system 40 for lubricating moving component parts. The lubrication system 64 may also provide the oil to the planetary gear system 40 for use in squeeze film damping and, therefore, the lubrication system 64 may also be referred to as a squeeze film fluid supply system. The LP rotor shaft 36 may be supported by a bearing 66, and the fan shaft 38 may be supported by a bearing 68.

Figure 3:
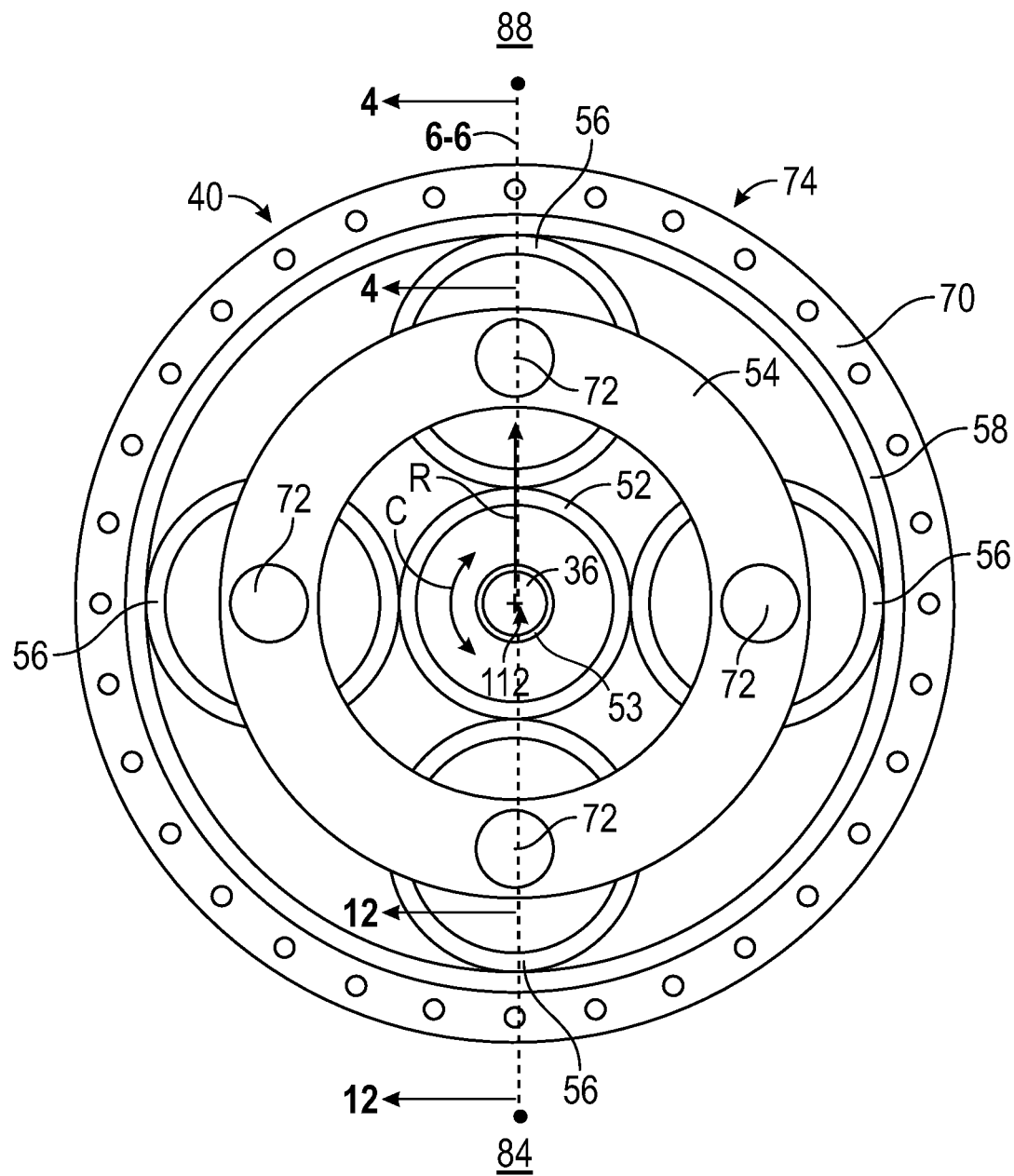
FIG. 3 is a schematic, aft-looking view of a planetary gear system taken at view 3-3 of FIG. 1, according to an aspect of the present disclosure.

FIG. 3 is a schematic, aft-looking view of the planetary gear system 40 taken at view 3-3 of FIG. 1. The planetary gear system 40 defines a centerline axis 112, which may correspond to the axial centerline axis 12 of FIG. 1. A longitudinal direction (L) extends along the centerline axis 112, a radial direction (R) extends outward from the centerline axis 112, and a circumferential direction (C) extends about the centerline axis 112. The sun gear 52 is configured to be connected to the LP rotor shaft 36, which rotates in the circumferential direction about the centerline axis 112. For example, the sun gear 52 may include an input shaft 53 that is coupled to the LP rotor shaft 36 via a bolted joint, a universal joint, or via a splined joint where the input shaft 53 includes internal splines (not shown) and the LP rotor shaft 36 includes external splines that engage with the internal splines. The plurality of planet gears 56 are connected to the carrier 54 via respective planet gear shafts 72. While not shown in FIG. 3, bearings are provided between each of the planet gears 56 and their respective planet gear shaft 72 such that, each planet gear 56 rotates about the planet gear shaft 72. Each of the planet gears 56 engage with the sun gear 52 such that, when the LP rotor shaft 36 rotates due to the LP turbine 30 rotating during operation of the engine 10, the sun gear 52 also rotates about the centerline axis 112 of the planetary gear system 40. The rotation of the sun gear 52 causes each of the planet gears 56 to rotate about their respective planet gear shaft 72, and also causes the carrier 54 connected to the planet gears 56 via the planet gear shafts 72 to rotate about the centerline axis 112. The carrier 54 is configured to be connected to the fan shaft 38, and when the carrier 54 rotates about the centerline axis 112, the fan shaft 38 also rotates, thereby supporting operation of the fan assembly 14. For example, a shaft adapter (not shown) may be connected to the carrier via a bolted connected, where the shaft adapter includes a shaft portion that can be coupled to the fan shaft 38 via a bolted joint, a universal joint, or a splined joint similar to that described above for the sun gear 52. Each of the planet gears 56 also engages with the ring gear 58. The ring gear 58 is connected to a damper housing 70 to thereby form a ring gear assembly 74. The damper housing 70 is connected with the frame structure 60 (FIG. 2) via the fasteners 62 (FIG. 2). Thus, the ring gear 58 is stationary (i.e., non-rotating) with respect to the centerline axis 112 when the sun gear 52 and the carrier 54 rotate about the centerline axis 112. In the planetary gear system 40, the planet gears 56 may have a single gear mesh that engages both the sun gear 52 and the ring gear 58. However, the planetary gear system 40 of the present disclosure is not limited to such a configuration and other configurations may implement the disclosure. For example, the planet gears 56 may include dual gear meshes, where a first gear mesh of the planet gear 56 engages with the sun gear 52 and a second gear mesh of the planet gear 56 engages with the ring gear 58. Such a configuration may provide for different gear reduction/increase ratios within the planetary gear system 40.

Figure 4:
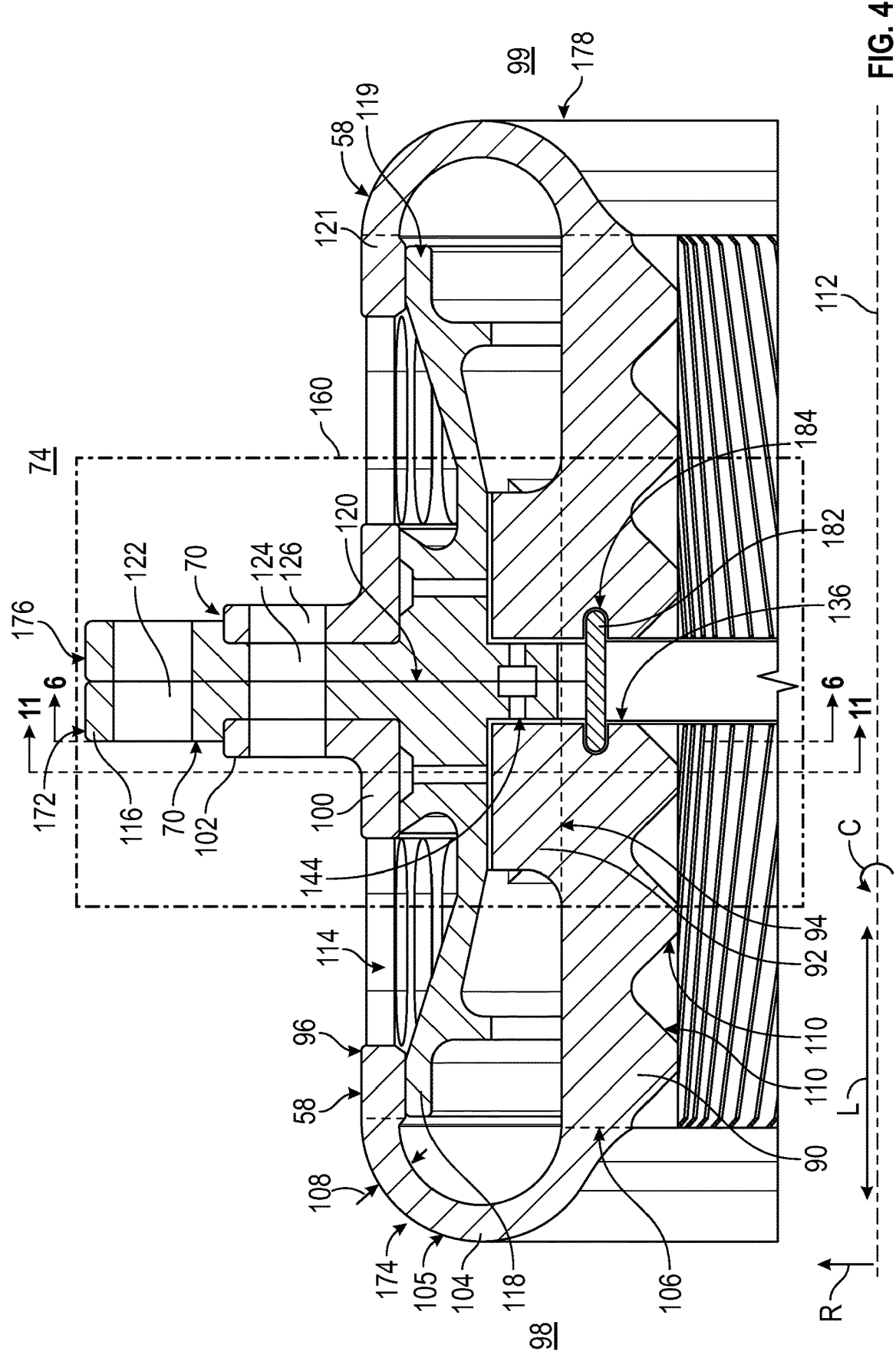
FIG. 4 is a partial cross-sectional view of a ring gear assembly taken at plane 4-4 of FIGS. 3 and 6, according to an aspect of the present disclosure.
Figure 5:
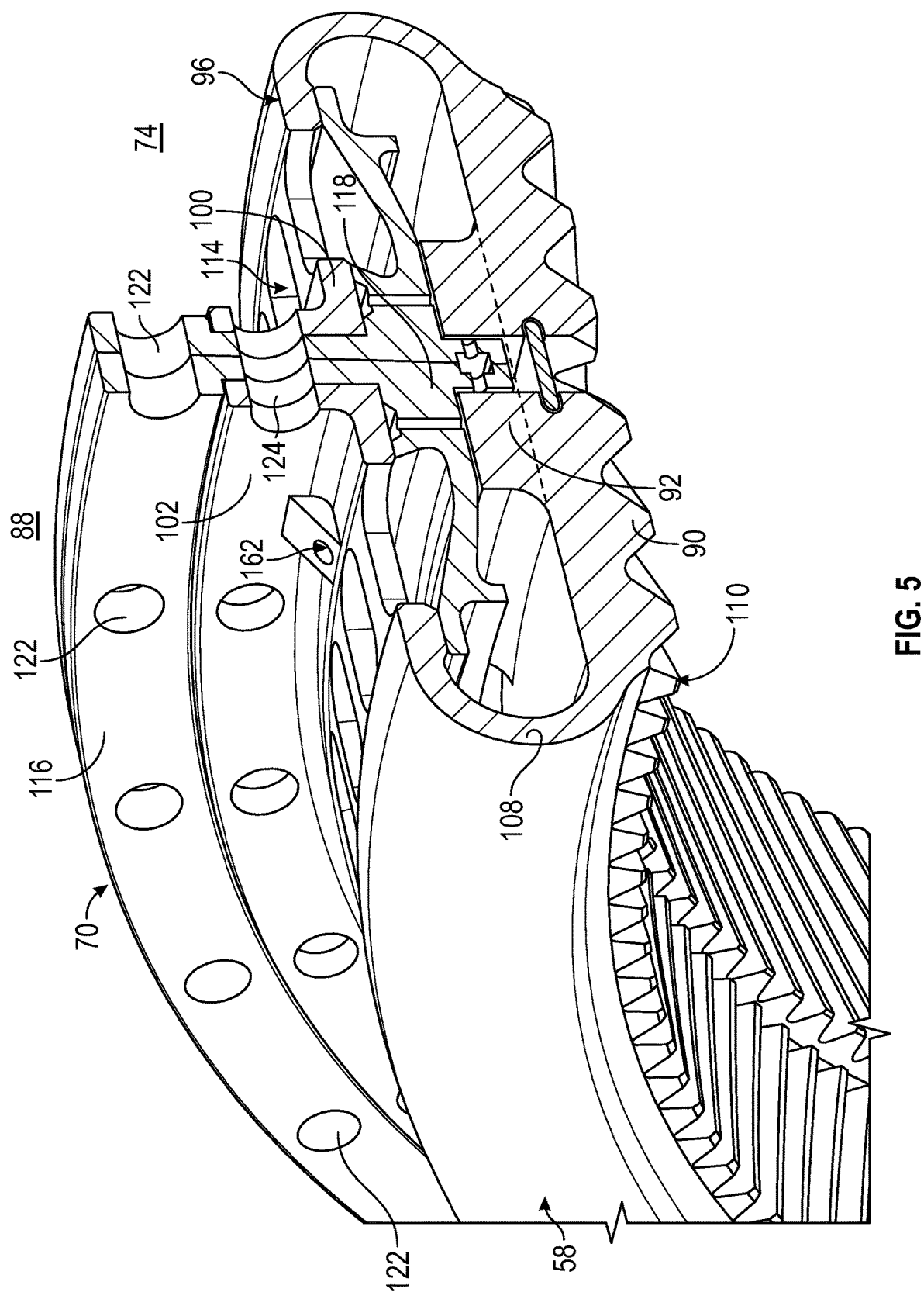
FIG. 5 is a perspective view of the partial cross section of FIG. 4, according to an aspect of the present disclosure.
Figure 6:
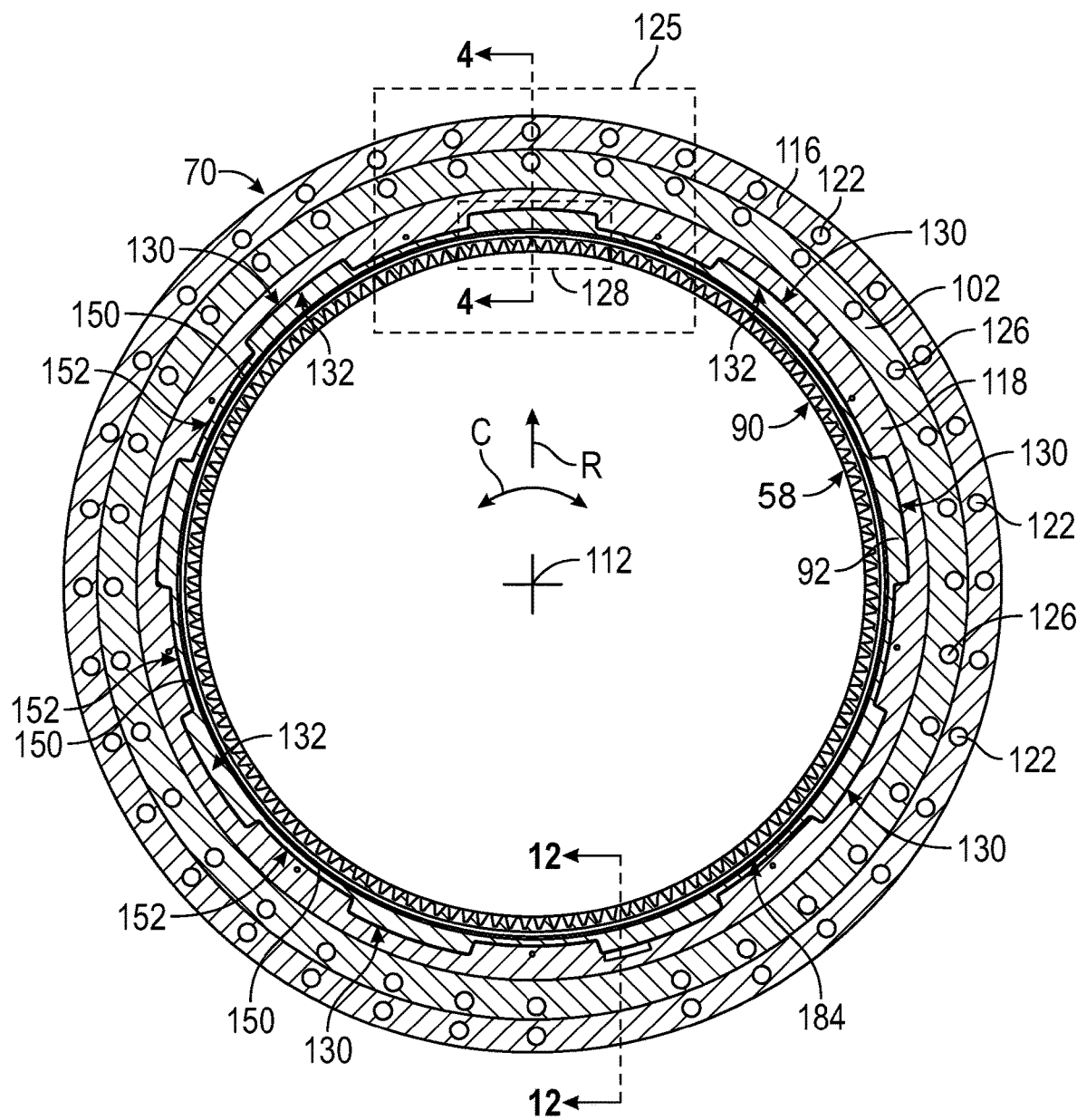
FIG. 6 is an aft looking cross-sectional view (looking into the plane of the paper) of a ring gear assembly along plane 6-6 in FIG. 3 (see also FIG. 4), according to an aspect of the present disclosure.

FIG. 4 is a partial cross-sectional view of a ring gear assembly taken at plane 4-4 of FIGS. 3 and 6, according to an aspect of the present disclosure. FIG. 5 is a perspective view of the partial cross section of FIG. 4. Referring to FIGS. 4 and 5, the ring gear assembly 74 is depicted as a dual ring gear/damper housing that includes a first ring gear 174, and a second ring gear 178 that may be a mirror image of the first ring gear 174. In addition, the damper housing 70 includes a first damper housing 172 and a second damper housing 176 that may also be a mirror image of the first damper housing 172. The first damper housing 172 is connected to the second damper housing 176 via the fasteners 62 (FIG. 2), and the first ring gear 174 is connected to the first damper housing 172, and the second ring gear 178 is connected to the second damper housing 176. The following description of the features defining the ring gear 58 and defining the damper housing 70, however, will generally be made with respect to one ring gear 58 and one damper housing 70. The ring gear 58 may include a geared wall 90 extending in the longitudinal direction (L) and extending circumferentially about the centerline axis 112, and including a plurality of gear teeth 110. The ring gear 58 also includes a damper housing engagement wall 92 extending in the radial direction (R) from a first end 94 of the geared wall 90 and extending circumferentially about the centerline axis 112. Various features of the damper housing engagement wall 92 will be discussed in more detail below. The ring gear 58 also includes a flexible damping wall 104 connected to a second end 106 of the geared wall 90, and a damper housing attachment member 96. The damper housing attachment member 96 includes a longitudinal wall 100 radially spaced apart from the geared wall 90 and extending in the longitudinal direction from the flexible damping wall 104. The longitudinal wall 100 may include a plurality of ring gear scavenge openings 114 extending therethrough to allow a lubricant (e.g., oil) to flow therethrough. The damper housing attachment member 96 further includes a damper housing connecting wall 102 connected with the longitudinal wall 100 and extending outward therefrom in the radial direction. The damper housing connecting wall 102 includes a plurality of connecting openings 126 therethrough for connecting the ring gear 58 to the damper housing 70.

In the FIG. 4 and FIG. 5 aspect, the flexible damping wall 104 is shown as being a generally semi-circular tubular-shaped wall 105 that extends circumferentially about the centerline axis 112, and that connects the second end 106 of the geared wall 90 with the longitudinal wall 100 of the damper housing attachment member 96. The flexible damping wall 104 has a flexible damping wall thickness 108. The semi-circular tubular-shape of the flexible damping wall 104 provides for radial flexure and damping of the geared wall 90 during operation of the planetary gear system 40, and the flexible damping wall thickness 108 may be a parameter that is implemented to provide a predetermined radial stiffness based on radial loads anticipated to be imparted to the geared wall 90, and, more particularly, to the second end 106 of the geared wall 90, by the planet gears 56 during operation of the planetary gear system 40.

Referring still to FIGS. 4 and 5, the damper housing 70 includes a damper housing radial wall 116 extending in the radial direction and extending circumferentially about the centerline axis 112. The damper housing radial wall 116 includes a plurality of frame mounting openings 122 for mounting the ring gear assembly 74 to the frame structure 60 (FIG. 2) via the fasteners 62 (FIG. 2). The damper housing radial wall 116 also includes a plurality of ring gear mounting openings 124 for connecting the ring gear 58 to the damper housing 70 via fasteners (not shown) provided through the connecting openings 126 of the ring gear 58 and the ring gear mounting openings 124.

The damper housing 70 further includes a damper housing ring gear engagement wall 118 extending in the longitudinal direction from a radially inner end 120 of the damper housing radial wall 116 and extending circumferentially about the centerline axis 112. An outer end 119 of the damper housing ring gear engagement wall 118 engages the longitudinal wall 100 so as to provide support to an outer end 121 of the longitudinal wall 100 in a radially inward direction. The damper housing ring gear engagement wall 118 and its engagement with the ring gear 58 will now be described in more detail.

Figure 7:
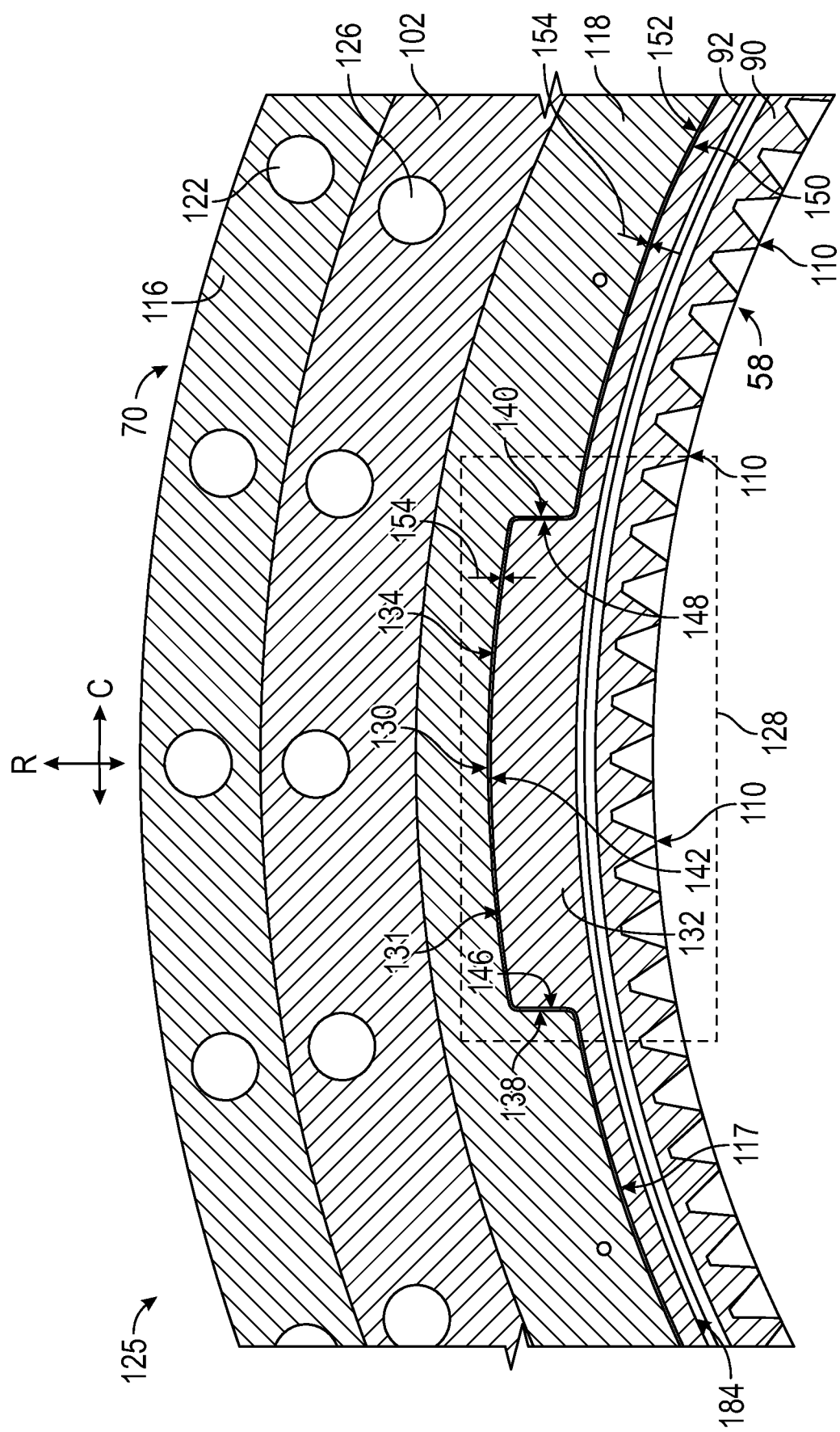
FIG. 7 is an enlarged view of a portion of the cross section of FIG. 6, taken at detail view 125 of FIG. 6, according to an aspect of the present disclosure.

FIG. 6 is an aft looking cross-sectional view (looking into the plane of the paper) of a ring gear assembly along plane 6-6 in FIG. 3 (see also FIG. 4), according to an aspect of the present disclosure. FIG. 7 is an enlarged view of a portion of the cross section of FIG. 6, taken at detail view 125 of FIG. 6. Referring to FIGS. 6 and 7, the ring gear 58 and the damper housing 70 engage each other via a plurality of squeeze film damping members 128 that provide damping of loads in various directions imparted by the ring gear 58 to the damper housing 70, and that also function as deflection delimiters to limit the amount of deflection of the ring gear 58 from the imparted loads. Each of the squeeze film damping members 128 generally includes a damper housing squeeze film engagement member 130 in the damper housing 70, and a ring gear squeeze film engagement member 132 of the ring gear 58 that engages the damper housing squeeze film engagement member 130. As shown in FIG. 6, the plurality of squeeze film damping member 128 are circumferentially spaced apart about the centerline axis 112. As will be described in more detail below, the damper housing squeeze film engagement member 130 is generally formed as a cavity within the damper housing ring gear engagement wall 118 of the damper housing 70 from a radially inner surface 117 (FIG. 7) of the damper housing ring gear engagement wall 118.

Referring to FIG. 7, the ring gear squeeze film engagement member 132 includes a ring gear squeeze film engagement member radial outer side 134, a ring gear squeeze film engagement member first longitudinal side 136 (FIG. 4), a ring gear squeeze film engagement member first circumferential side 138, and a ring gear squeeze film engagement member second circumferential side 140. In FIG. 7, the damper housing squeeze film engagement member 130 is formed as a cavity 131 that includes a cavity radial outer side 142, a cavity longitudinal side 144 (FIG. 4), a cavity first circumferential side 146, and a cavity second circumferential side 148. Gaps 154, that function as, and may also be referred to as, deflection limiters, are provided between the ring gear squeeze film engagement member radial outer side 134 and the cavity radial outer side 142, between the ring gear squeeze film engagement member first longitudinal side 136 and the cavity longitudinal side 144, between the ring gear squeeze film engagement member first circumferential side 138 and the cavity first circumferential side 146, and between the ring gear squeeze film engagement member second circumferential side 140 and the cavity second circumferential side 148. The gaps 154 allow a squeeze film fluid (e.g., oil) to be injected therein to provide squeeze film damping in the planetary gear system 40 by injecting the squeeze film between the damper housing squeeze film engagement member 130 and the ring gear squeeze film engagement member 132. The gaps 154 also act as deflection delimiters to limit the deflection of the planetary gear system 40 in three degrees of freedom in the event of that an overload condition occurs.

Figure 8:
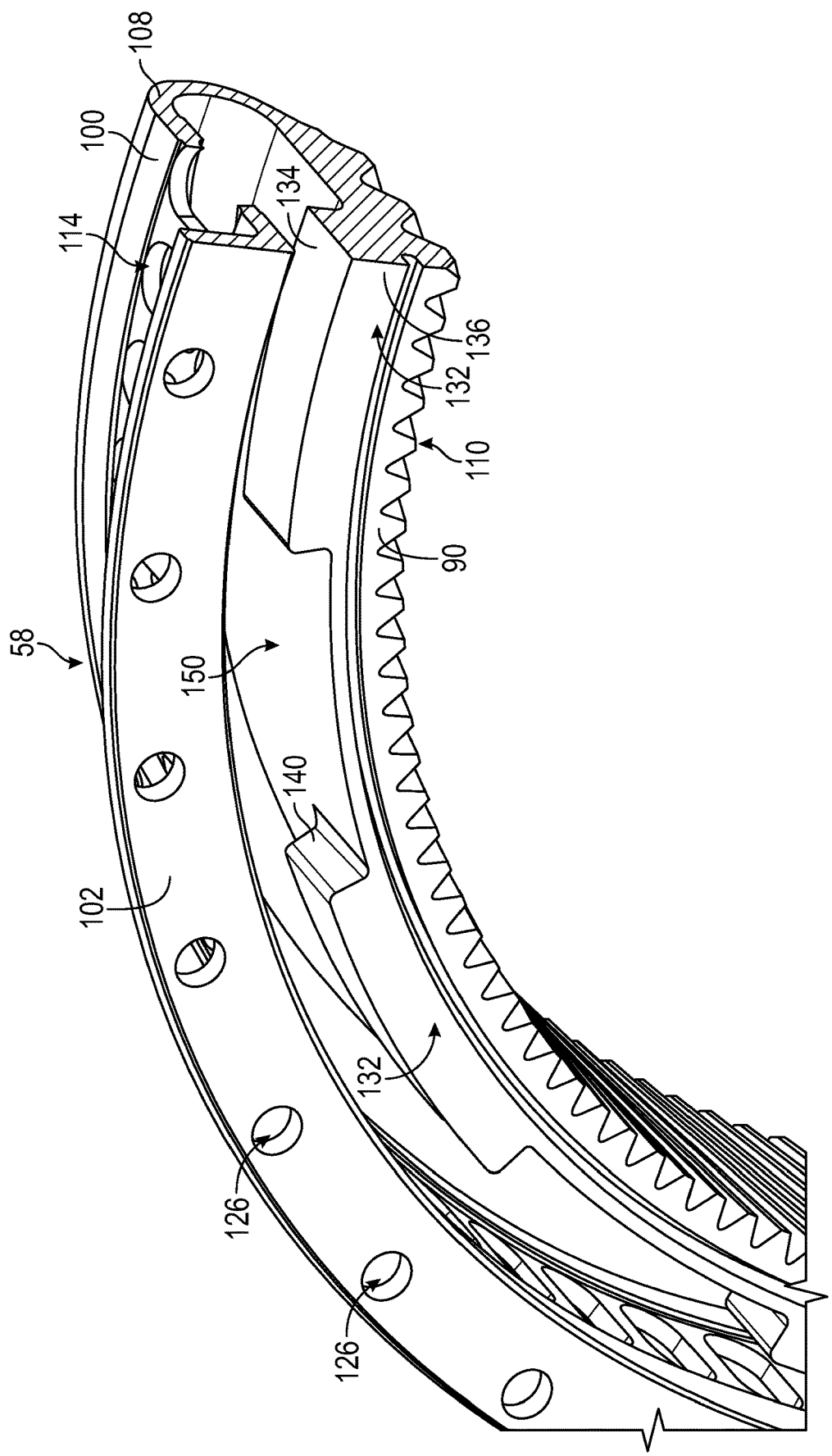
FIG. 8 is a perspective, cut-away view of a portion of a ring gear, according to an aspect of the present disclosure.
Figure 9:
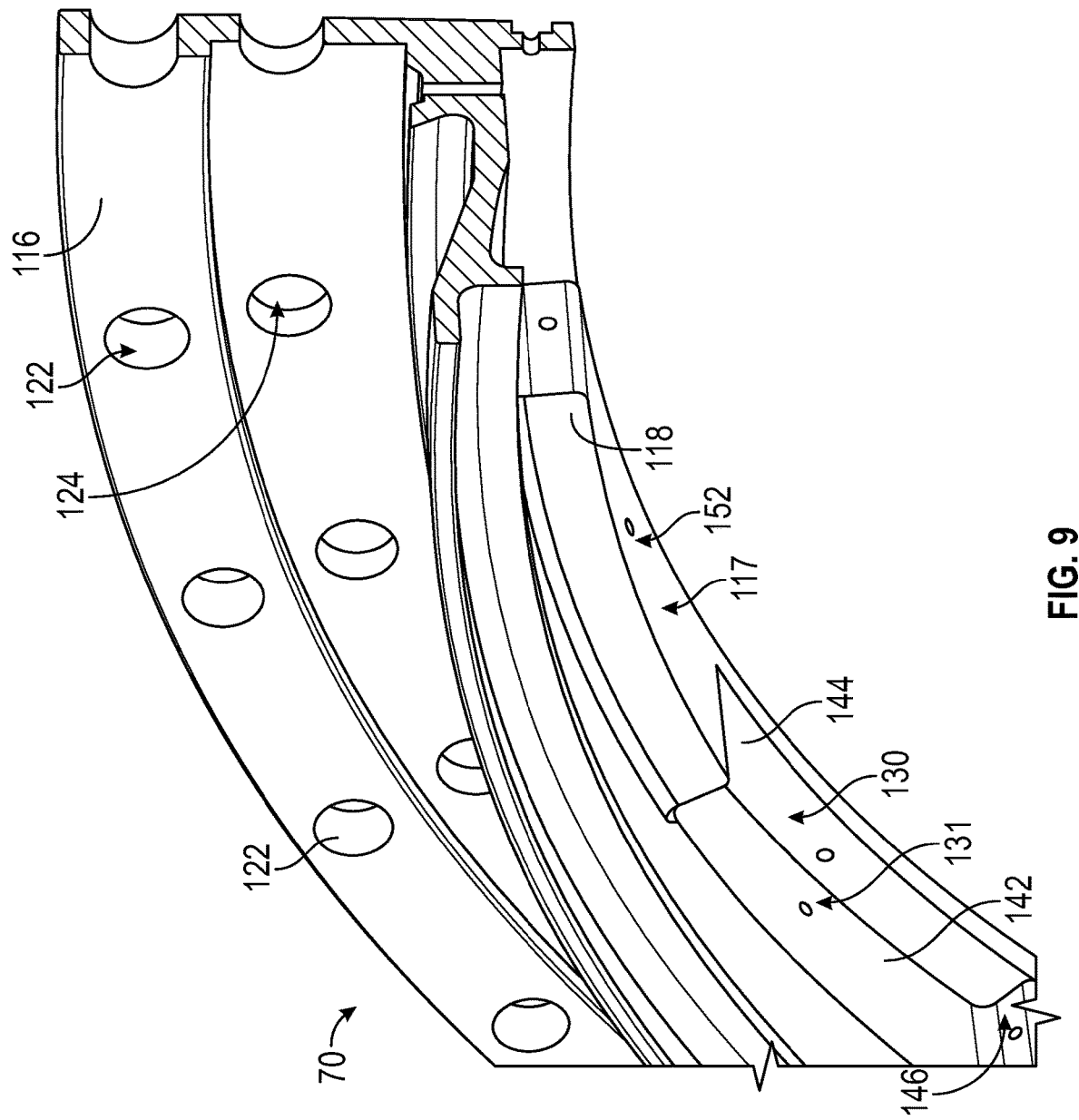
FIG. 9 is a perspective, cut-away view of a portion of a damper housing, according to an aspect of the present disclosure.

As shown in FIG. 6, the ring gear 58 also includes a plurality of ring gear lands 150 arranged between each of the ring gear squeeze film engagement members 132. FIG. 8 is a perspective, cut-away view of a portion of the ring gear 58 that also depicts the ring gear squeeze film engagement members 132 and the ring gear lands 150. In FIG. 6, the damper housing 70 is shown to include a plurality of damper housing lands 152 arranged between the damper housing squeeze film engagement members 130. FIG. 9 is a perspective cut-away view of a portion of the damper housing 70 that also depicts the damper housing squeeze film engagement members 130 and the damper housing land 152. The small gap 154 (FIG. 7) may also be provided between the ring gear land 150 and the damper housing land 152 so as to permit a squeeze film to be injected therebetween so as to provide damping of the ring gear in the radial direction.

Figure 10:
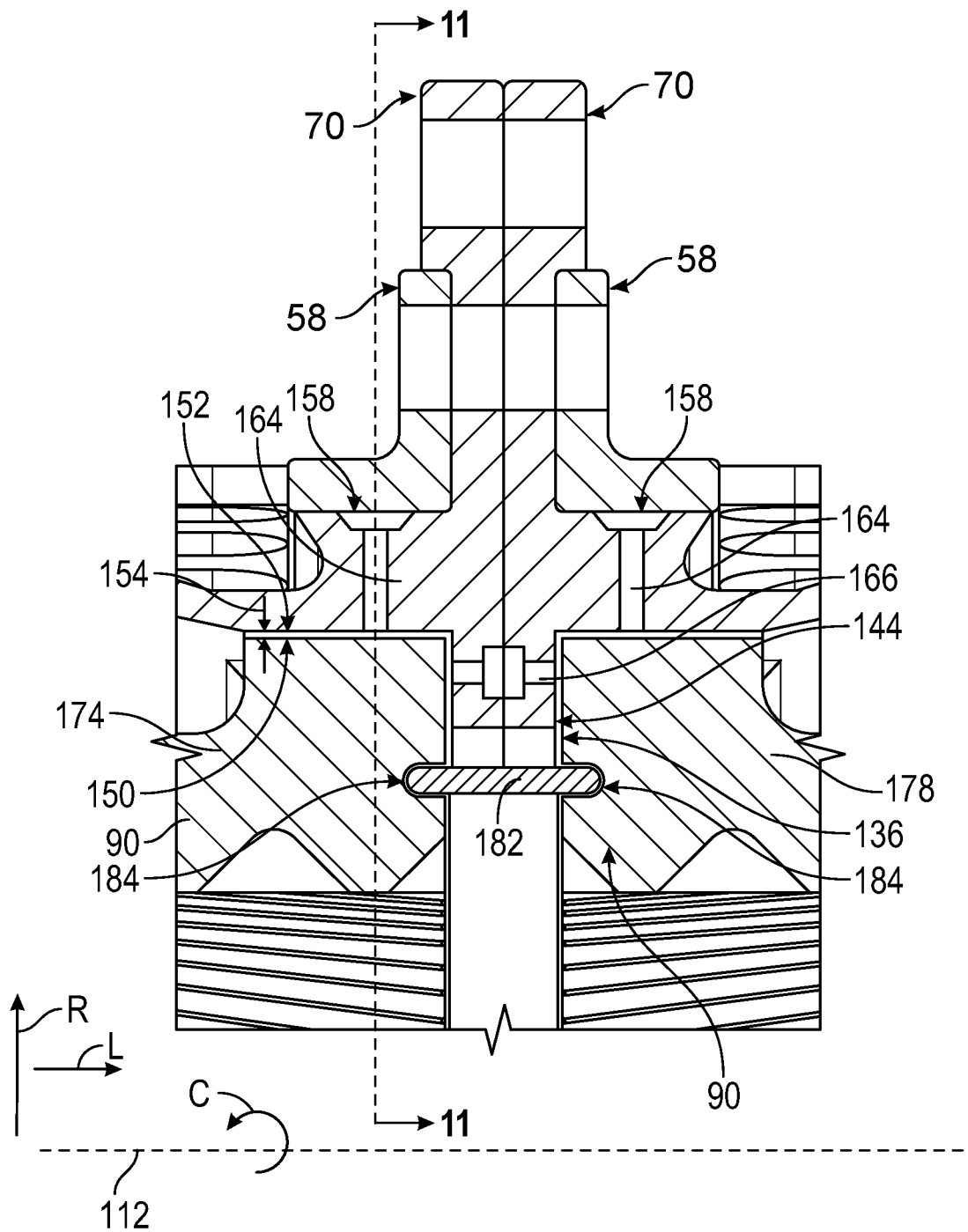
FIG. 10 is an enlarged view of the partial cross-sectional view of FIG. 4 taken at detail view 160, according to an aspect of the present disclosure.
Figure 11:
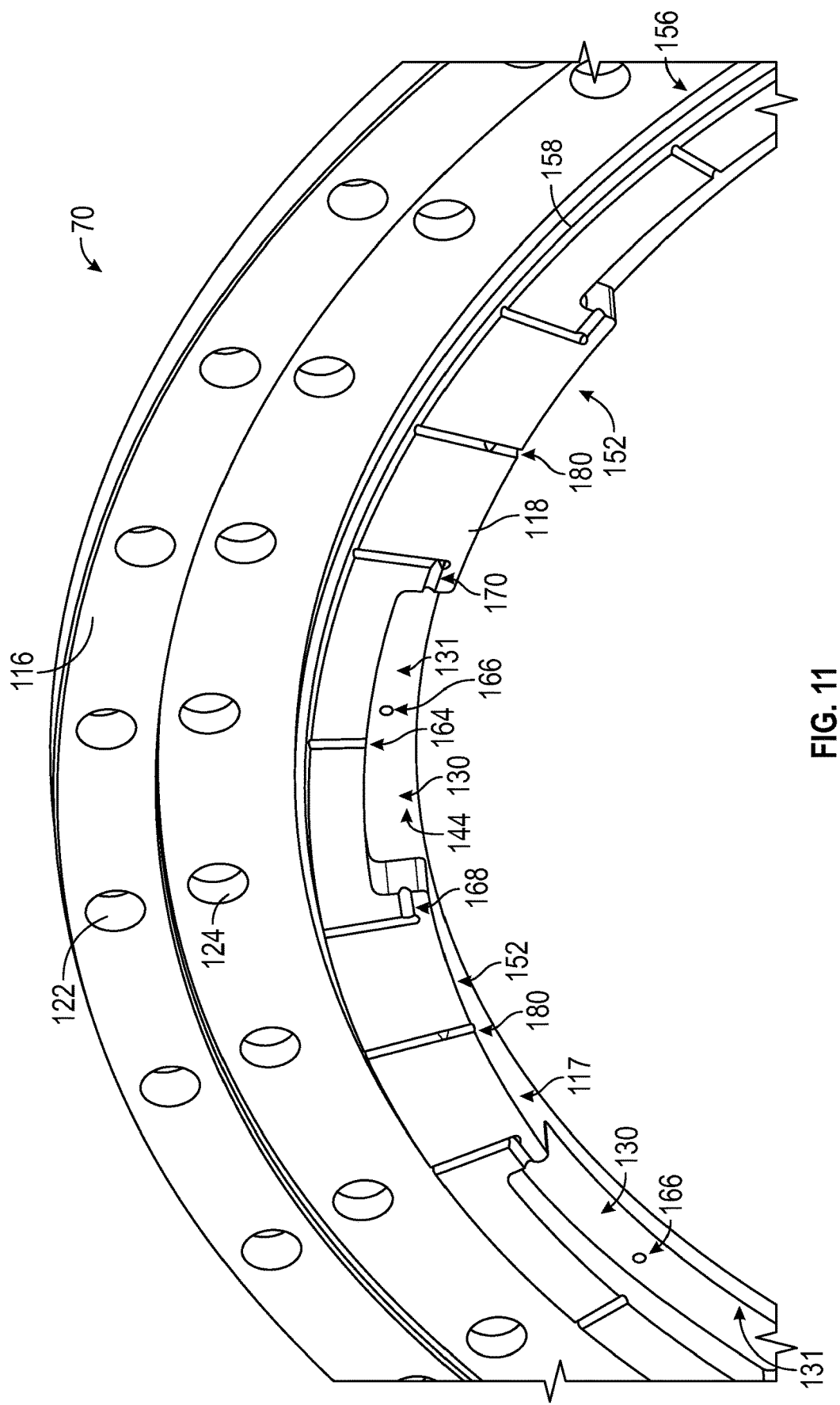
FIG. 11 is a perspective cross-sectional view of a portion of the damper housing taken at plane 11-11 of FIG. 4 and FIG. 10, according to an aspect of the present disclosure.

Referring now to FIGS. 10 and 11, a squeeze film feed circuit for circulating the squeeze film fluid (e.g., oil) within the ring gear assembly 74 will be described. FIG. 10 is an enlarged view of the partial cross-sectional view of FIG. 4 taken at detail view 160, and FIG. 11 is a perspective cross-sectional view of a portion of the damper housing taken at plane 11-11 of FIG. 4 and FIG. 10. In providing the squeeze film damping of the ring gear 58, the damper housing 70 includes a squeeze film feed circuit 156 that includes multiple fluid feed channels and outlet ports. Referring briefly to FIG. 5, the ring gear includes a squeeze film inlet port 162 on a radially top side 88 of the ring gear assembly 74 that feeds a squeeze film fluid (e.g., oil) into a main squeeze film feed channel 158 (FIGS. 10 and 11) that is part of the squeeze film feed circuit 156. As seen in FIG. 11, the main squeeze film feed channel 158 extends circumferentially about the damper housing ring gear engagement wall 118. The squeeze film feed circuit 156 further includes multiple branched ports that branch off the main squeeze film feed channel 158, including a plurality of cavity inlet ports that provide the squeeze film to the cavity 131. For example, the cavity inlet ports may include a radial damping inlet port 164 that provides the squeeze film into the cavity 131 for radial squeeze film damping in the radial direction between the ring gear squeeze film engagement member radial outer side 134 (FIG. 7) and the cavity radial outer side 142 (FIG. 7). A longitudinal damping inlet port 166 provides the squeeze film between the ring gear squeeze film engagement member first longitudinal side 136 (FIG. 4) and the cavity longitudinal side 144 so as to provide longitudinal squeeze film damping in the longitudinal direction. A first torsional damping inlet port 168 provides the squeeze film between the ring gear squeeze film engagement member first circumferential side 138 (FIG. 7) and the cavity first circumferential side 146 (FIG. 7) to provide a first torsional squeeze film damping, and a second torsional damping inlet port 170 provides the squeeze film between the ring gear squeeze film engagement member second circumferential side 140 (FIG. 7) and the cavity second circumferential side 148 (FIG. 7) to provide a second torsional squeeze film damping. Thus, torsional damping of the ring gear 58 in the circumferential direction is provided by the first torsional squeeze film damping and the second torsional squeeze film damping. In addition, a land inlet port 180 branches from the main squeeze film feed channel 158 so as to provide the squeeze film between the ring gear land 150 (FIG. 7) and the damper housing land 152 (FIG. 7) and provide further damping of the ring gear 58 in the radial direction.

Referring to FIGS. 4 and 10, in the dual ring gear aspect of the ring gear assembly 74, a scavenge shield member 182 is provided between the first ring gear 174 and the second ring gear 178. The scavenge shield member 182 extends circumferentially about the centerline axis 112 and is inserted into a scavenge shield slot 184 within the geared wall 90 of the first ring gear 174 and a scavenge shield slot 184 within the geared wall 90 of the second ring gear 178. As seen in FIGS. 6 and 7, the scavenge shield slot 184 extends circumferentially about the centerline axis 112.

Figure 12:
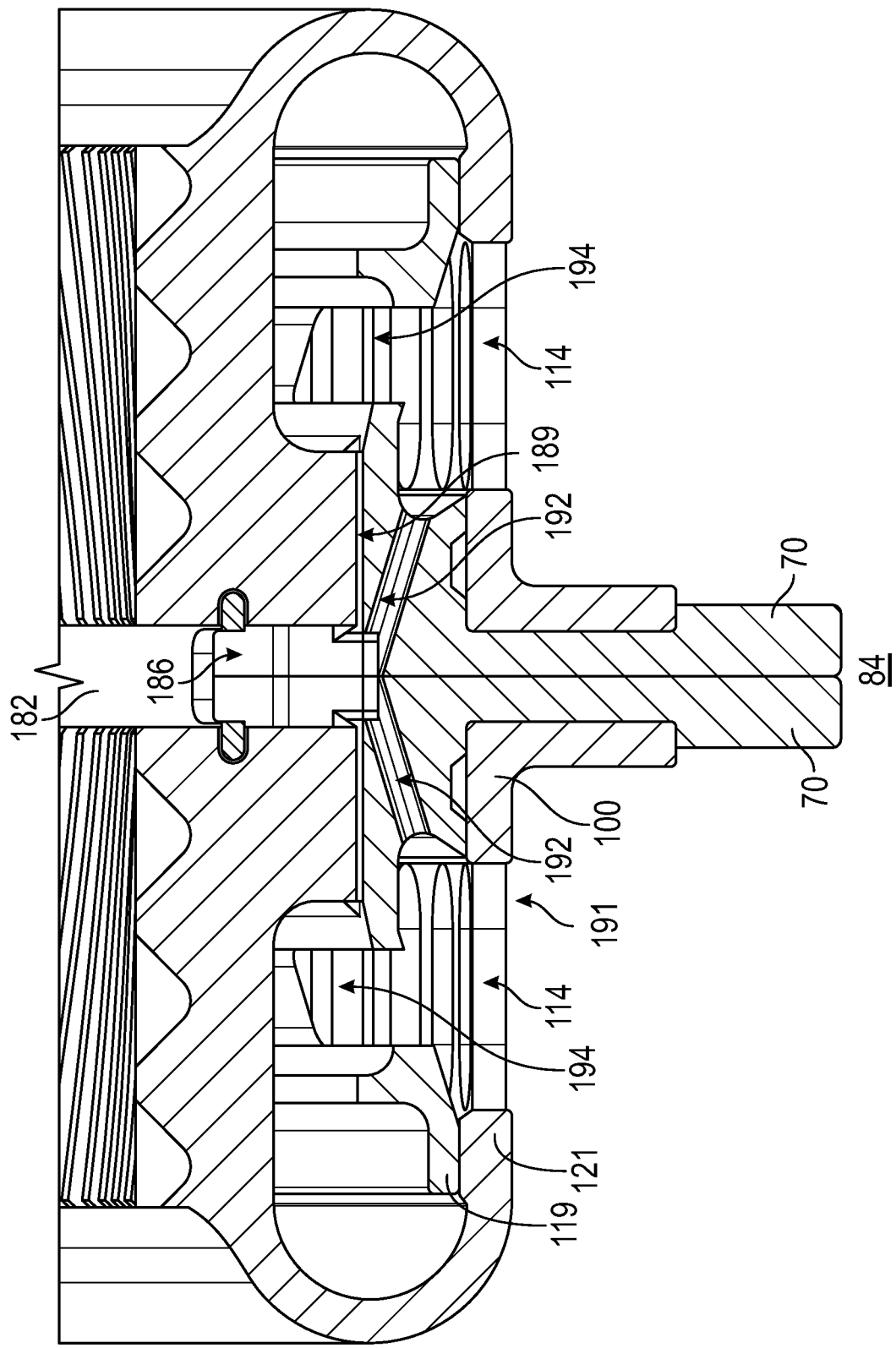
FIG. 12 is a partial cross-sectional view of the bottom side of the ring gear assembly taken at plane 12-12 of FIGS. 3 and 6, according to an aspect of the present disclosure.
Figure 13:
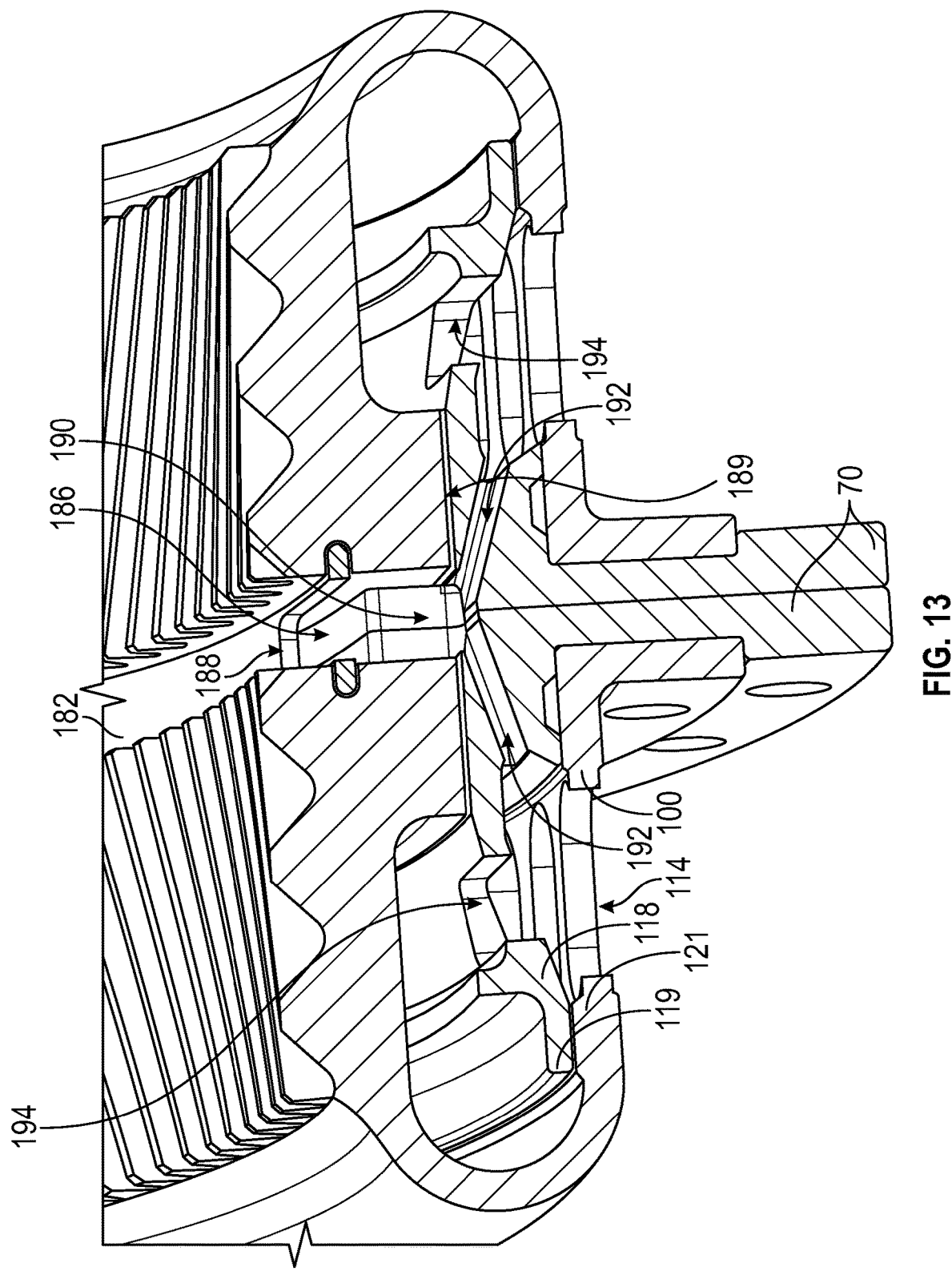
FIG. 13 is a perspective view of the cross-sectional view of FIG. 12, according to an aspect of the present disclosure.

FIG. 12 is a partial cross-sectional view of the bottom side of the ring gear assembly taken at plane 12-12 of FIGS. 3 and 6, according to an aspect of the present disclosure. FIG. 13 is a perspective view of the cross-sectional view of FIG. 12. As shown in FIGS. 12 and 13, the scavenge shield member 182 includes a scavenge shield opening 186 therethrough on a radially bottom side 188 of the scavenge shield member 182. The damper housing 70 includes, at a radially bottom side 189 of the damper housing 70, a damper housing scavenge drain opening 190 and a damper housing scavenge drain ports 192. The damper housing ring gear engagement wall 118 of the damper housing 70 also includes a damper housing scavenge drain slot 194. In addition, at least one of the ring gear scavenge openings 114 is arranged at a radially bottom side 191 of the ring gear 58. Thus, oil circulated through the damper housing squeeze film feed circuit 156 can be provided to a scavenge system to be collected for recirculation through the squeeze film feed circuit 156.

The planetary gear system according to the present disclosure provides for better damping and deflection limitation of loads in three directions imparted against the ring gear, including longitudinal loads, radial loads and torsional loads. The squeeze film dampers between the ring gear and the damper housing provide squeeze film damping in all three directions, while also acting as deflection delimiters to limit the amount of deflection that may occur in the event of an overload condition. In addition, the flexible damping wall provides better stiffness for radial loads imparted against the ring gear on the outer end away from the squeeze film dampers and defection delimiters, while also allowing flexibility of the ring gear for radial loading against the ring gear outer end.

While the foregoing description relates generally to a gas turbine engine, the gas turbine engine may be implemented in various environments. For example, the engine may be implemented in an aircraft, but may also be implemented in non-aircraft applications, such as power generating stations, marine applications, or oil and gas production applications. Thus, the present disclosure is not limited to use in aircraft.

Further aspects of the present disclosure are provided by the subject matter of the following clauses.

A planetary gear system including a sun gear connectable with an input shaft, a plurality of planet gears connected to a carrier, the carrier being connectable to an output shaft, the plurality of planet gears engaging with the sun gear, and a ring gear assembly including a damper housing, and a ring gear connected to the damper housing and engaging with the plurality of planet gears, wherein the ring gear includes a geared wall having a plurality of gear teeth engaging with the plurality of planet gears, and a damper housing attachment member radially spaced outward of the geared wall and attaching the ring gear to the damper housing, a first end of the geared wall and the damper housing engaging each other via a plurality of squeeze film damping members and deflection limiters, and a second end of the geared wall being connected to the damper housing attachment member via a flexible damping wall, the flexible damping wall providing a radial damping of the second end of the geared wall.

The planetary gear system according to the preceding clause, wherein the planetary gear system defines a longitudinal direction along a centerline axis of the planetary gear system, a radial direction extending from the centerline axis, and a circumferential direction extending about the centerline axis, the sun gear and the carrier being rotational about the centerline axis, the damper housing being connectable to a frame structure, and the plurality of squeeze film damping members providing a squeeze film damping of the ring gear in the longitudinal direction, in the radial direction, and in the circumferential direction.

The planetary gear system according to any preceding clause, wherein each of the plurality of squeeze film damping members comprises a damper housing squeeze film engagement member in the damper housing, and a ring gear squeeze film engagement member of the ring gear engaged with the damper housing squeeze film engagement member.

The planetary gear system according to any preceding clause, wherein the damper housing includes (a) a damper housing radial wall extending in the radial direction and extending circumferentially about the centerline axis, and (b) a damper housing ring gear engagement wall extending in the longitudinal direction from a radially inner end of the damper housing radial wall and extending circumferentially about the centerline axis, the damper housing ring gear engagement wall including the plurality of the damper housing squeeze film engagement members circumferentially spaced about the centerline axis, and the ring gear includes (a) the geared wall extending in the longitudinal direction and extending circumferentially about the centerline axis, (b) a damper housing engagement wall extending in the radial direction from the first end of the geared wall and extending circumferentially about the centerline axis, (c) the flexible damping wall extending circumferentially about the centerline axis, and (d) the damper housing attachment member including (i) a longitudinal wall radially spaced apart from the geared wall and extending in the longitudinal direction from the flexible damping wall, and (ii) a damper housing connecting wall connected with the longitudinal wall and extending outward therefrom in the radial direction.

The planetary gear system according to any preceding clause, wherein the damper housing connecting wall of the ring gear is connected to the damper housing radial wall of the damper housing via a plurality of fasteners, and the damper housing radial wall is connected to the frame structure.

The planetary gear system according to any preceding clause, wherein each damper housing squeeze film engagement member comprises a cavity extending into the damper housing ring gear engagement wall from a radially inner surface of the damper housing ring gear engagement wall, each cavity including a cavity radial outer side, a cavity longitudinal side, a cavity first circumferential side, and a cavity second circumferential side.

The planetary gear system according to any preceding clause, wherein the damper housing includes a squeeze film feed circuit circulating a squeeze film therewithin.

The planetary gear system according to any preceding clause, further comprising a squeeze film supply system connected to the squeeze film feed circuit, the squeeze film supply system being connected to a squeeze film inlet port arranged at a radially top side of the planetary gear system.

The planetary gear system according to any preceding clause, wherein the squeeze film feed circuit includes a plurality of cavity inlet ports arranged in each cavity and providing the squeeze film to the cavity.

The planetary gear system according to any preceding clause, wherein the plurality of cavity inlet ports comprise a radial damping inlet port arranged through the cavity radial outer side, a longitudinal damping inlet port arranged through the cavity longitudinal side, a first torsional damping inlet port arranged through the cavity first circumferential side, and a second torsional damping inlet port arranged through the cavity second circumferential side.

The planetary gear system according to any preceding clause, wherein each ring gear squeeze film engagement member of the ring gear includes a ring gear squeeze film engagement member radial outer side, a ring gear squeeze film engagement member first longitudinal side, a ring gear squeeze film engagement member first circumferential side, and a ring gear squeeze film engagement member second circumferential side.

The planetary gear system according to any preceding clause, wherein the squeeze film feed circuit provides (i) the squeeze film fluid through the radial damping inlet port to provide a radial squeeze film damping between the cavity radial outer side and the ring gear squeeze film engagement member radial outer side, (ii) the squeeze film fluid through the longitudinal damping inlet port to provide a longitudinal squeeze film damping between the cavity longitudinal side and the ring gear squeeze film engagement member first longitudinal side, (iii) the squeeze film fluid through the first torsional damping inlet port to provide a first torsional squeeze film damping between the cavity first circumferential side and the ring gear squeeze film engagement member first circumferential side, and (iv) the squeeze film fluid through the second torsional damping inlet port to provide a second torsional squeeze film damping between the cavity second circumferential side and the ring gear squeeze film engagement member second circumferential side.

The planetary gear system according to any preceding clause, wherein the flexible damping wall comprises a semi-circular tubular-shaped wall extending circumferentially about a centerline axis of the planetary gear system, and having a flexible damping wall thickness.

The planetary gear system according to any preceding clause, wherein the flexible damping wall thickness is configured as a parameter to implement a predetermined radial stiffness of the flexible damping wall based on radial loads applied to the ring gear by the plurality of planet gears.

The planetary gear system according to any preceding clause, further comprising a first damper housing and a second damper housing connected to each other, and a first ring gear connected to the first damper housing and a second ring gear connected to the second damper housing.

The planetary gear system according to any preceding clause, further comprising a scavenge shield member extending circumferentially about a centerline axis of the planetary gear system, the scavenge shield member including a scavenge shield opening extending therethrough on a radially bottom side of the scavenge shield member.

The planetary gear system according to any preceding clause, wherein the damper housing includes a damper housing scavenge drain opening extending therethrough on a radially bottom side of the damper housing.

The planetary gear system according to any preceding clause, wherein the ring gear includes a damper housing attachment member that includes a plurality of ring gear scavenge openings extending therethrough, at least one of the plurality of ring gear scavenge openings being arranged on a radially bottom side of the ring gear.

A gas turbine engine including a fan assembly, a turbine section including a low pressure turbine, a planetary gear system for driving the fan assembly, the planetary gear system connected with a frame structure of the turbine engine, an input shaft connecting the low pressure turbine and the planetary gear system, and an output shaft connecting the planetary gear system and the fan assembly, the planetary gear system including (a) a sun gear connected with the input shaft, (b) a plurality of planet gears connected to a carrier, the carrier connected to the output shaft, the plurality of planet gears engaging with the sun gear, and (c) a ring gear assembly including a damper housing connected to the frame structure, and a ring gear connected to the damper housing and engaging with the plurality of planet gears, wherein the ring gear includes a geared wall having a plurality of gear teeth engaging with the plurality of planet gears, and a damper housing attachment member radially spaced outward of the geared wall and attaching the ring gear to the damper housing, a first end of the geared wall and the damper housing engaging each other via a plurality of squeeze film damping members, and a second end of the geared wall being connected to the damper housing attachment member via a flexible damping wall, the flexible damping wall providing a radial damping of the second end of the geared wall.

The gas turbine engine according to the preceding clause, wherein the plurality of squeeze film damping members provide a squeeze film damping of the ring gear in a longitudinal direction, in a radial direction, and in a circumferential direction, and each of the plurality of squeeze film damping members comprises a damper housing squeeze film engagement member in the damper housing, and a ring gear squeeze film engagement member of the ring gear being engaged with the damper housing squeeze film engagement member.

The gas turbine engine according to any preceding clause, wherein the planetary gear system defines a longitudinal direction along a centerline axis of the planetary gear system, a radial direction extending from the centerline axis, and a circumferential direction extending about the centerline axis, the sun gear and the carrier being rotational about the centerline axis, the damper housing having a structure for connecting a frame structure, and the plurality of squeeze film damping members providing a squeeze film damping of the ring gear in the longitudinal direction, in the radial direction, and in the circumferential direction.

The gas turbine engine according to any preceding clause, wherein each of the plurality of squeeze film damping members comprises a damper housing squeeze film engagement member in the damper housing, and a ring gear squeeze film engagement member of the ring gear engaged with the damper housing squeeze film engagement member.

The gas turbine engine according to any preceding clause, wherein the damper housing includes (a) a damper housing radial wall extending in the radial direction and extending circumferentially about the centerline axis, and (b) a damper housing ring gear engagement wall extending in the longitudinal direction from a radially inner end of the damper housing radial wall and extending circumferentially about the centerline axis, the damper housing ring gear engagement wall including the plurality of the damper housing squeeze film engagement members circumferentially spaced about the centerline axis, and the ring gear includes (a) the geared wall extending in the longitudinal direction and extending circumferentially about the centerline axis, (b) a damper housing engagement wall extending in the radial direction from the first end of the geared wall and extending circumferentially about the centerline axis, (c) the flexible damping wall extending circumferentially about the centerline axis, and (d) the damper housing attachment member including (i) a longitudinal wall radially spaced apart from the geared wall and extending in the longitudinal direction from the flexible damping wall, and (ii) a damper housing connecting wall connected with the longitudinal wall and extending outward therefrom in the radial direction.

The gas turbine engine according to any preceding clause, wherein the damper housing connecting wall of the ring gear is connected to the damper housing radial wall of the damper housing via a plurality of fasteners, and the damper housing radial wall is connected to the frame structure.

The gas turbine engine according to any preceding clause, wherein each damper housing squeeze film engagement member comprises a cavity extending into the damper housing ring gear engagement wall from a radially inner surface of the damper housing ring gear engagement wall, each cavity including a cavity radial outer side, a cavity longitudinal side, a cavity first circumferential side, and a cavity second circumferential side.

The gas turbine engine according to any preceding clause, wherein the damper housing includes a squeeze film feed circuit circulating a squeeze film therewithin.

The gas turbine engine according to any preceding clause, further comprising a squeeze film supply system connected to the squeeze film feed circuit, the squeeze film supply system being connected to a squeeze film inlet port arranged at a radially top side of the planetary gear system.

The gas turbine engine according to any preceding clause, wherein the squeeze film feed circuit includes a plurality of cavity inlet ports arranged in each cavity and providing the squeeze film to the cavity.

The gas turbine engine according to any preceding clause, wherein the plurality of cavity inlet ports comprise a radial damping inlet port arranged through the cavity radial outer side, a longitudinal damping inlet port arranged through the cavity longitudinal side, a first torsional damping inlet port arranged through the cavity first circumferential side, and a second torsional damping inlet port arranged through the cavity second circumferential side.

The gas turbine engine according to any preceding clause, wherein each ring gear squeeze film engagement member of the ring gear includes a ring gear squeeze film engagement member radial outer side, a ring gear squeeze film engagement member first longitudinal side, a ring gear squeeze film engagement member first circumferential side, and a ring gear squeeze film engagement member second circumferential side.

The gas turbine engine according to any preceding clause, wherein the squeeze film feed circuit provides (i) the squeeze film fluid through the radial damping inlet port to provide a radial squeeze film damping between the cavity radial outer side and the ring gear squeeze film engagement member radial outer side, (ii) the squeeze film fluid through the longitudinal damping inlet port to provide a longitudinal squeeze film damping between the cavity longitudinal side and the ring gear squeeze film engagement member first longitudinal side, (iii) the squeeze film fluid through the first torsional damping inlet port to provide a first torsional squeeze film damping between the cavity first circumferential side and the ring gear squeeze film engagement member first circumferential side, and (iv) the squeeze film fluid through the second torsional damping inlet port to provide a second torsional squeeze film damping between the cavity second circumferential side and the ring gear squeeze film engagement member second circumferential side.

The gas turbine engine according to any preceding clause, wherein the flexible damping wall comprises a semi-circular tubular-shaped wall extending circumferentially about a centerline axis of the planetary gear system, and having a flexible damping wall thickness.

The gas turbine engine according to any preceding clause, wherein the flexible damping wall thickness is a parameter to implement a predetermined radial stiffness of the flexible damping wall based on radial loads applied to the ring gear by the plurality of planet gears.

The gas turbine engine according to any preceding clause, further comprising a first damper housing and a second damper housing connected to each other, and a first ring gear connected to the first damper housing and a second ring gear connected to the second damper housing.

The gas turbine engine according to any preceding clause, further comprising a scavenge shield member extending circumferentially about a centerline axis of the planetary gear system, the scavenge shield member including a scavenge shield opening extending therethrough on a radially bottom side of the scavenge shield member.

The gas turbine engine according to any preceding clause, wherein the damper housing includes a damper housing scavenge drain opening extending therethrough on a radially bottom side of the damper housing.

The gas turbine engine according to any preceding clause, wherein the ring gear includes a damper housing attachment member that includes a plurality of first ring gear scavenge openings extending therethrough, at least one of the plurality of first ring gear scavenge openings being arranged on a radially bottom side of the ring gear.

Although the foregoing description is directed to some exemplary embodiments of the present disclosure, other variations and modifications will be apparent to those skilled in the art, and may be made without departing from the spirit or the scope of the disclosure. Moreover, features described in connection with one embodiment of the present disclosure may be used in conjunction with other embodiments, even if not explicitly stated above.

We claim:

1. A planetary gear system comprising:
   a sun gear connectable with an input shaft;
   a plurality of planet gears connected to a carrier, the carrier being connectable to an output shaft, the plurality of planet gears engaging with the sun gear; and
   a ring gear assembly including a damper housing and a ring gear, the ring gear connected to the damper housing and engaging with the plurality of planet gears;
   wherein the ring gear includes a geared wall having a plurality of gear teeth engaging with the plurality of planet gears, and a damper housing attachment member radially spaced outward of the geared wall and attaching the ring gear to the damper housing, a first end of the geared wall and the damper housing engaging each other via a plurality of squeeze film damping members and deflection limiters, and a second end of the geared wall being connected to the damper housing attachment member via a flexible damping wall, the flexible damping wall providing a radial damping of the second end of the geared wall.

2. The planetary gear system according to claim 1, wherein the planetary gear system defines a longitudinal direction along a centerline axis of the planetary gear system, a radial direction extending from the centerline axis, and a circumferential direction extending about the centerline axis, the sun gear and the carrier being rotational about the centerline axis, the damper housing having a structure for mounting the planetary gear system to a frame structure, and the plurality of squeeze film damping members providing a squeeze film damping of the ring gear in the longitudinal direction, in the radial direction, and in the circumferential direction.

3. The planetary gear system according to claim 2, wherein each of the plurality of squeeze film damping members comprises a damper housing squeeze film engagement member in the damper housing, and a ring gear squeeze film engagement member of the ring gear engaged with the damper housing squeeze film engagement member.

4. The planetary gear system according to claim 3, wherein the damper housing includes (a) a damper housing radial wall extending in the radial direction and extending circumferentially about the centerline axis, and (b) a damper housing ring gear engagement wall extending in the longitudinal direction from a radially inner end of the damper housing radial wall and extending circumferentially about the centerline axis, the damper housing ring gear engagement wall including the plurality of the damper housing squeeze film engagement members circumferentially spaced about the centerline axis, and
   the ring gear includes (a) the geared wall extending in the longitudinal direction and extending circumferentially about the centerline axis, (b) a damper housing engagement wall extending in the radial direction from the first end of the geared wall and extending circumferentially about the centerline axis, (c) the flexible damping wall extending circumferentially about the centerline axis, and (d) the damper housing attachment member including (i) a longitudinal wall radially spaced apart from the geared wall and extending in the longitudinal direction from the flexible damping wall, and (ii) a damper housing connecting wall connected with the longitudinal wall and extending outward therefrom in the radial direction.

5. The planetary gear system according to claim 4, wherein the damper housing connecting wall of the ring gear is connected to the damper housing radial wall of the damper housing via a plurality of fasteners, and the damper housing radial wall is connected to the frame structure.

6. The planetary gear system according to claim 3, wherein each damper housing squeeze film engagement member comprises a cavity extending into the damper housing ring gear engagement wall from a radially inner surface of the damper housing ring gear engagement wall, each cavity including a cavity radial outer side, a cavity longitudinal side, a cavity first circumferential side, and a cavity second circumferential side.

7. The planetary gear system according to claim 6, wherein the damper housing includes a squeeze film feed circuit circulating a squeeze film therewithin.

8. The planetary gear system according to claim 7, further comprising a squeeze film supply system connected to the squeeze film feed circuit, the squeeze film supply system being connected to a squeeze film inlet port arranged at a radially top side of the planetary gear system.

9. The planetary gear system according to claim 7, wherein the squeeze film feed circuit includes a plurality of cavity inlet ports arranged in each cavity and providing the squeeze film to the cavity.

10. The planetary gear system according to claim 9, wherein the plurality of cavity inlet ports comprise a radial damping inlet port arranged through the cavity radial outer side, a longitudinal damping inlet port arranged through the cavity longitudinal side, a first torsional damping inlet port arranged through the cavity first circumferential side, and a second torsional damping inlet port arranged through the cavity second circumferential side.

11. The planetary gear system according to claim 10, wherein each ring gear squeeze film engagement member of the ring gear includes a ring gear squeeze film engagement member radial outer side, a ring gear squeeze film engagement member first longitudinal side, a ring gear squeeze film engagement member first circumferential side, and a ring gear squeeze film engagement member second circumferential side.

12. The planetary gear system according to claim 11, wherein the squeeze film feed circuit provides (i) the squeeze film fluid through the radial damping inlet port to provide a radial squeeze film damping between the cavity radial outer side and the ring gear squeeze film engagement member radial outer side, (ii) the squeeze film fluid through the longitudinal damping inlet port to provide a longitudinal squeeze film damping between the cavity longitudinal side and the ring gear squeeze film engagement member first longitudinal side, (iii) the squeeze film fluid through the first torsional damping inlet port to provide a first torsional squeeze film damping between the cavity first circumferential side and the ring gear squeeze film engagement member first circumferential side, and (iv) the squeeze film fluid through the second torsional damping inlet port to provide a second torsional squeeze film damping between the cavity second circumferential side and the ring gear squeeze film engagement member second circumferential side.

13. The planetary gear system according to claim 1, wherein the flexible damping wall comprises a semi-circular tubular-shaped wall extending circumferentially about a centerline axis of the planetary gear system, and having a flexible damping wall thickness.

14. The planetary gear system according to claim 13, wherein the flexible damping wall thickness is configured as a parameter to implement a predetermined radial stiffness of the flexible damping wall based on radial loads applied to the ring gear by the plurality of planet gears.

15. The planetary gear system according to claim 1, further comprising a first damper housing and a second damper housing connected to each other, and a first ring gear connected to the first damper housing and a second ring gear connected to the second damper housing.

16. The planetary gear system according to claim 15, further comprising a scavenge shield member extending between the first ring gear and the second ring gear, and extending circumferentially about a centerline axis of the planetary gear system, the scavenge shield member including a scavenge shield opening extending therethrough on a radially bottom side of the scavenge shield member.

17. The planetary gear system according to claim 1, wherein the damper housing includes a damper housing scavenge drain opening extending therethrough on a radially bottom side of the damper housing.

18. The planetary gear system according to claim 1, wherein the ring gear includes a damper housing attachment member that includes a plurality of ring gear scavenge openings extending therethrough, at least one of the plurality of ring gear scavenge openings being arranged on a radially bottom side of the ring gear.

19. A gas turbine engine comprising:
a fan assembly;
a turbine section including a low pressure turbine;
a planetary gear system for driving the fan assembly, the planetary gear system connected with a frame structure of the turbine engine;
an input shaft connecting the low pressure turbine and the planetary gear system; and
an output shaft connecting the planetary gear system and the fan assembly,
the planetary gear system comprising:
(a) a sun gear connected with the input shaft;
(b) a plurality of planet gears connected to a carrier, the carrier connected to the output shaft, the plurality of planet gears engaging with the sun gear; and
(c) a ring gear assembly including a damper housing connected to the frame structure, and a ring gear connected to the damper housing and engaging with the plurality of planet gears,
wherein the ring gear includes a geared wall having a plurality of gear teeth engaging with the plurality of planet gears, and a damper housing attachment member radially spaced outward of the geared wall and attaching the ring gear to the damper housing, a first end of the geared wall and the damper housing engaging each other via a plurality of squeeze film damping members, and a second end of the geared wall being connected to the damper housing attachment member via a flexible damping wall, the flexible damping wall providing a radial damping of the second end of the geared wall.

20. The gas turbine engine according to claim 19, wherein the plurality of squeeze film damping members provide a squeeze film damping of the ring gear in a longitudinal direction, in a radial direction, and in a circumferential direction, and each of the plurality of squeeze film damping members comprises a damper housing squeeze film engagement member in the damper housing, and a ring gear squeeze film engagement member of the ring gear being engaged with the damper housing squeeze film engagement member.

* * * * *